United States Patent
Bradl et al.

(10) Patent No.: US 10,344,348 B2
(45) Date of Patent: Jul. 9, 2019

(54) SLIDE RINGS HAVING A LEDEBURITIC MICROSTRUCTURE AT THE SURFACE

(71) Applicant: FEDERAL-MOGUL FRIEDBERG GMBH, Friedberg (DE)

(72) Inventors: Christoph Bradl, Friedberg (DE); Marc-Manuel Matz, Kissing (DE); Andreas Dengler, Friedberg (DE); Andreas Kumpfmuller, Friedberg (DE)

(73) Assignee: Federal-Mogul Friedberg GmbH, Friedberg (DE)

( * ) Notice: Subject to any disclaimer, the term of this patent is extended or adjusted under 35 U.S.C. 154(b) by 705 days.

(21) Appl. No.: 15/026,037

(22) PCT Filed: Jul. 3, 2014

(86) PCT No.: PCT/EP2014/064135
§ 371 (c)(1),
(2) Date: Mar. 30, 2016

(87) PCT Pub. No.: WO2015/043782
PCT Pub. Date: Apr. 2, 2015

(65) Prior Publication Data
US 2016/0244856 A1    Aug. 25, 2016

(30) Foreign Application Priority Data

Sep. 30, 2013   (DE) .................. 10 2013 219 784

(51) Int. Cl.
*C21D 1/09* (2006.01)
*C22C 33/04* (2006.01)
(Continued)

(52) U.S. Cl.
CPC ............... *C21D 9/40* (2013.01); *C21D 1/09* (2013.01); *C21D 1/34* (2013.01); *C21D 1/38* (2013.01);
(Continued)

(58) Field of Classification Search
CPC ... C21D 1/09; C21D 1/34; C21D 1/38; C21D 2211/002; C21D 2211/004;
(Continued)

(56) References Cited

U.S. PATENT DOCUMENTS

2009/0045586 A1* 2/2009 Cantow .................. C21D 1/09
277/406

FOREIGN PATENT DOCUMENTS

| DE | 34 18 555 C1 | 7/1985 |
| DE | 10 2005 054709 A1 | 5/2007 |
| GB | 2 057 510 A | 4/1981 |

* cited by examiner

*Primary Examiner* — Colleen P Dunn
*Assistant Examiner* — Anthony M Liang
(74) *Attorney, Agent, or Firm* — Robert L. Stearns; Dickinson Wright, PLLC

(57) ABSTRACT

A slide ring includes a main body composed of grey cast iron, wherein at least a partial region of a functional surface has a ledeburitic microstructure at the surface. A method for producing such a slide ring includes heating a functional surface of the slide ring by irradiating with high-energy radiation, wherein the irradiation is carried out so that at least a partial region of the irradiated surface is remelted, wherein the parameters of the irradiation are selected so that at least a partial region of the functional surface has a ledeburitic microstructure after cooling.

6 Claims, 2 Drawing Sheets

(51) Int. Cl.
- *C22C 33/08* (2006.01)
- *C21D 5/00* (2006.01)
- *C21D 9/40* (2006.01)
- *F16J 15/34* (2006.01)
- *C21D 1/34* (2006.01)
- *C21D 1/38* (2006.01)

(52) U.S. Cl.
CPC ............ *C21D 5/00* (2013.01); *C22C 33/04* (2013.01); *C22C 33/08* (2013.01); *F16J 15/3496* (2013.01); *C21D 2211/002* (2013.01); *C21D 2211/004* (2013.01); *C21D 2211/007* (2013.01); *C21D 2211/008* (2013.01); *C21D 2221/00* (2013.01); *C21D 2221/10* (2013.01); *C21D 2251/04* (2013.01)

(58) Field of Classification Search
CPC ........ C21D 2211/007; C21D 2211/008; C21D 2221/00; C21D 2221/10; C21D 2251/04; C21D 5/00; C22C 33/04; C22C 33/08; F16J 15/3496
See application file for complete search history.

SLIDE RINGS HAVING A LEDEBURITIC MICROSTRUCTURE AT THE SURFACE

BACKGROUND OF THE INVENTION

1. Technical Field

The invention relates to slide rings having a functional surface of ledeburitic microstructure, and a method for producing such rings.

2. Related Art

Owing to the required wear resistance, metallic slide seal rings are often manufactured from material which is as hard and wear-resistant as possible. This includes, for example, ledeburitic chilled cast iron or cast steel with a high chromium content. These materials usually have a high-degree of hardness (between 50-64 HRC) and a very good wear resistance with respect to abrasion. However, it is a disadvantage here that both the casting of the material and also the subsequent mechanical processing is only possible with great effort and high costs. Furthermore, these materials are very brittle, which can lead to fracture on impact load. In addition, the thermal conductivity is normally low.

In the production of cast iron, a differentiation is made between grey and white solidified cast iron. When the liquid cast iron solidifies in thermodynamic equilibrium, one speaks in terms of a stable solidification. The microstructure then consists principally of iron and free graphite and is designated as grey cast iron. However, when the system solidifies in metastatic equilibrium, a so-called ledeburitic microstructure of iron and iron carbide (white cast iron) is produced.

Therefore, a method for the production of slide rings with as wear-resistant a surface as possible is sought, which nevertheless is cost-efficient and simplifies the production.

SUMMARY OF THE INVENTION

According to the invention, a slide ring of grey cast iron is processed so that the microstructure at the functional surfaces differs from the remaining microstructure. For this, the surface of the ring is treated with energy-rich radiation, so that at least a partial region of the surface is remelted and on cooling of the component a ledeburitic microstructure occurs on the surface, in which substantially the entire carbon has been converted to iron carbide. The ledeburitic microstructure shows a substantially greater hardness and wear resistance than the original grey cast iron. Preferably a transition zone with martensitic microstructure (hardened microstructure) and free graphite adjoins the ledeburitic microstructure in the direction of the base material. The energy-rich radiation can be, for example, a laser beam or an electron beam or an arc in arc welding, plasma welding or tungsten inert gas welding.

In example embodiments, a pattern of partial regions with ledeburitic microstructure and other partial regions with hardened microstructure can be produced on the functional surface. Thus, regions with free graphite also alternate with those without free graphite, wherein the graphite can improve the lubricating properties. The hardened microstructure can comprise a martensitic and/or bainitic microstructure.

Depending on the embodiment, the ledeburitic microstructure can be present on the functional surface up to a depth of up to 1.5 mm. The functional surface here can be, for example, the sliding surface of a slide ring and/or an elastomer contact surface, or else a contact surface to a further component. In example embodiments, the surface of the functional surface can be provided, in addition, with a structure of depressions and/or pores.

Furthermore, a method is presented for the production of a slide ring, comprising the production of a slide ring from a grey cast iron; heating a functional surface by irradiating with high-energy radiation; wherein the irradiating is carried out so that at least a partial region of the irradiated surface is remelted; wherein the parameters of the irradiation are selected so that at least a partial region of the functional surface has a ledeburitic microstructure after cooling.

Preferably, the remelting can be carried out so that a transition zone with martensitic microstructure is produced between the ledeburitic microstructure and the grey cast iron. The cooling of the remelted zone can be achieved for example only by self-quenching.

In example embodiments, the irradiating can comprise one of the following methods: irradiating with a laser beam or electron beam, arc welding, plasma welding, tungsten inert gas welding.

Depending on the embodiment, in the production of the slide ring from grey cast iron, at least one carbide forming element can be added to the cast iron material, selected from V, Cr, W, and Si.

Optionally, the irradiation can be carried out so that locally the remelted partial regions and non-remelted partial regions of the surface form a predefined pattern of different microstructures.

BRIEF DESCRIPTION OF THE DRAWINGS

The invention is described in further detail below with the aid of example embodiments and drawings, in which.

DETAILED DESCRIPTION OF EMBODIMENTS

Figure 1:
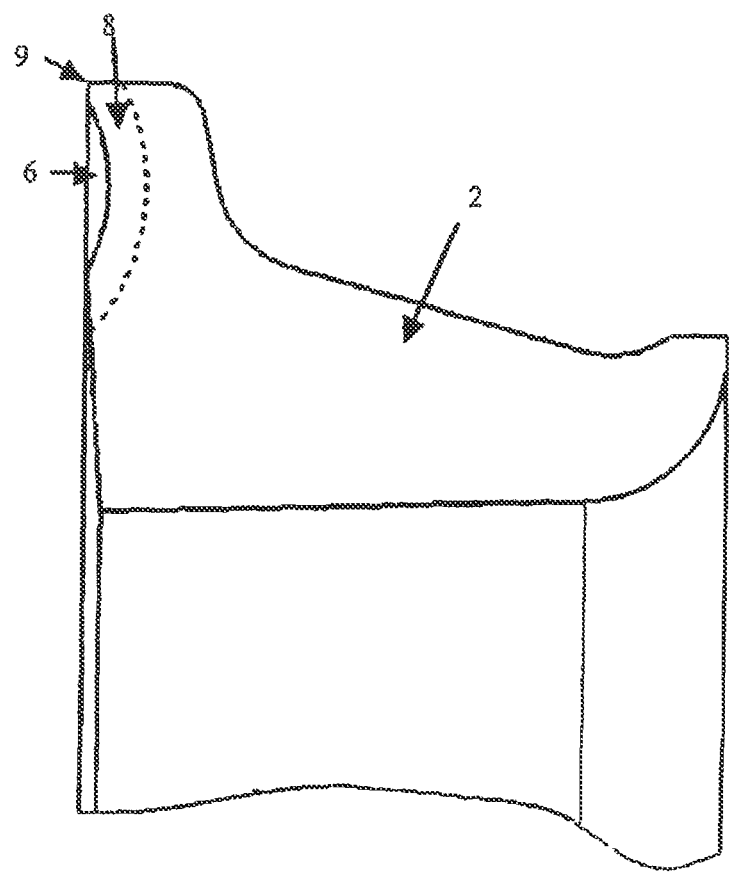
FIG. 1 shows a cross-section through a ring according to the invention with different microstructure zones.

In FIG. 1 an example slide ring is shown in cross-section, which has a functional surface according to the invention. In this case, the functional surface is the sliding surface 4 of the ring, which lies against, and slides on the counter-surface during operation. In further examples, additional or alternative functional surfaces can be present according to the invention, for instance the contact surface between elastomers and the slide ring. The base material 2 of the ring can be, for example, a grey cast iron, for instance a cast iron with lamellar graphite (EN-GJL), vermicular graphite (EN-GJV) or spheroidal graphite (EN-GJS).

On the functional surface 4, the remelting region 6 can be seen in section, which can extend for example up to a depth of approximately 1.5 mm perpendicularly to the surfaces. In this region, the base material 2 was remelted by energy-rich radiation such as for instance a laser beam. The remelting of this zone 6 in the region close to the surface and subsequent self-quenching by the rapid temperature equalization between heated edge region and adjoining material volume leads to the formation of a ledeburitic microstructure in this region 6; there, therefore, subsequently a metastable microstructure of iron and iron carbide is present, which is substantially free of free carbon or respectively graphite.

Instead of a laser beam, the surface could also be treated with other energy-rich radiation or respectively the action of heat. For example, in a similar manner, an electron beam could be used. Other conceivable methods for producing a ledeburitic microstructure on the surface are arc welding methods such as tungsten inert gas welding (TIG) and plasma welding. It is understandable to the specialist that also equivalent methods can be applied, which enable a locally defined remelting on the surface in a short time.

If, in an example embodiment, a laser beam is used as energy source, for example a beam width between 3 and 8 mm could be used. With an output of 1 to 4.5 kW with a non-pulsed laser beam, then for example the surface can be processed with a feed rate of 0.5 to 2 meters per minute, so that the corresponding regions are melted and cooled again by self-quenching, as was described above. Likewise, however, of course, other parameters, other outputs, pulsed laser radiation and/or other methods are conceivable, which lead to the described remelting on the surface and produce a ledeburitic microstructure.

Adjoining the remelting region 6 in the direction of the component centre in cross-section there is a transition region 8, which is likewise illustrated in a differentiated manner with respect to the remaining material 2—by a dashed line. The transition region 8 is not remelted, but shows only a hardened microstructure which is altered by the influence of heat, for example a substantially martensitic microstructure with graphite. Adjoining the hardened region or respectively transition region 8 is then the base microstructure 2, i.e. the original grey cast iron. Depending on the remelting process and base material, also more than these three zones 6, 8, 2 shown in FIG. 1 can arise, for example different zones with martensite and bainite.

In particular, the processing with a laser beam or other intensely focused irradiation make it possible to remelt only clearly defined regions of the surface. Thus, the entire functional surface 4 can be remelted superficially to a ledeburitic microstructure 6, for example the entire sliding surface of a slide ring. Likewise, however, also only parts of these surfaces can be remelted, for example in the form of regular patterns or larger sections. The non-remelted regions can either remain untreated or only hardened, without remelting. In this way, for example, regions can be produced in which partially a purely ledeburitic microstructure without free carbon is present and, adjacent, regions which only have a hardened microstructure, but still have free carbon in the form, of graphite. The regions with graphite can bring about an improved thermal conductivity; in addition, the running characteristics can be thereby improved. The surface quality of the remelted zone can lie for example at a surface roughness $R_z$ of less than 20 □m.

In alternative embodiments, a residual amount of free graphite can also be present in the ledeburitic microstructure region.

In addition, carbide forming elements can also already be added into the grey cast iron in the base material. Such carbide forming elements are, for example, Cr, V, Si, Mo or W. Then, in the remelting process, further carbides can occur additionally to the iron carbide, such as for instance $Cr_2C_3$, SiC, VC or WC, which influence the hardness characteristics of the surface in a further positive manner. For example. Mo up to 17% by weight, preferably 0.5 to 5% by weight, Si up to 4.5% by weight, W up to 5% by weight, preferably 0.3-1.5% by weight, V up to 2% by weight and/or up to 30% by weight Cr can be contained in the base material. One or more different carbide forming elements can be contained in the material in any desired suitable combination. Likewise, self-lubricating substances can be supplemented in the base material, such as for instance graphite, hexagonal boron nitride, $Mo_2S$ or other suitable substances; here, also, individual substances or a combination thereof can be introduced.

Alternatively or additionally to carbide forming elements contained in the base material, suitable carbides and/or other particles, such as for instance the named (or similar) self-lubricating substances, could be additionally introduced into the melt by dispersing directly during the remelting process.

Figure 2:
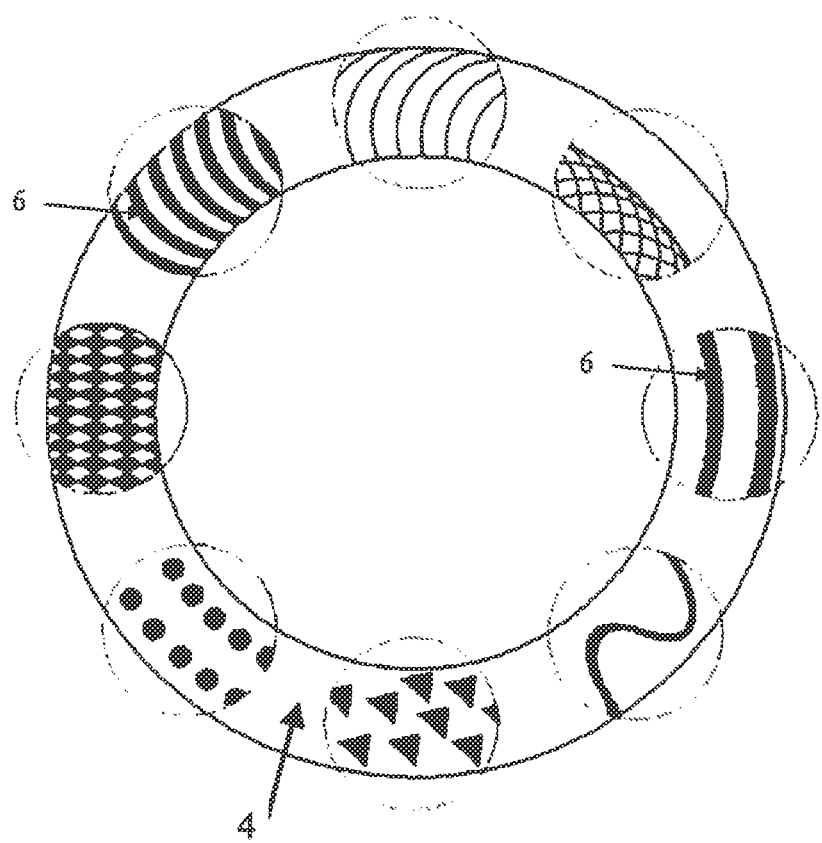
FIG. 2 shows different patterns as an overview, which can be present in the remelted regions of a slide ring according to the invention.

FIG. 2 shows different patterns which can be produced for example by means of a laser beam on a surface in the region of a functional surface 4 (sliding surface). Thus, a pattern of points, triangles or rhombi could be present. Likewise, wider or very thin linear patterns could be produced, wherein the lines can be aligned in circumferential direction or transversely and/or obliquely thereto. Sinuous lines or crossed lines could be arranged. Here, the black regions of the pattern examples in FIG. 2 could, in an example embodiment, represent the remelted regions with ledeburitic microstructure 6, whilst the remaining white regions show the non-remelted, only hardened regions with graphite. Likewise, however, also the microstructure distribution could be reversed and the white regions could be remelted by laser to a ledeburitic microstructure. Through the focused laser beam or similar methods, a very exactly localized irradiation and heating is possible. Of course, different patterns could also be combined with one another as desired, for instance depending on the practically expected load of the respective functional surface. In addition, in this way the pattern can also have regions of different height, so that for example the hardened microstructure projects minimally further or less than the ledeburitic microstructure. The tribological characteristics of the surface are dependent on the patterns which are present and can thus be adapted in a targeted manner.

The targeted remelting in the region of the functional surfaces makes it possible, furthermore, to leave the edge sharp between the running surface or sliding surface and web, so that after the hardening or respectively remelting no further processing of this edge is necessary. This also applies to other rings or ring sections; necessary processing steps can be carried out before the remelting on the softer grey cast iron, because the already processed regions can be exempt from the remelting, if this is desired.

Through a defined processing of the surface, again for example by a laser beam, cracks, channels or pores can also be introduced in a targeted manner into the region of the functional surface. Such structures can then serve in operation as oil retaining volume and can additionally improve the lubricating characteristics. The pore structures can form micro-pressure chambers. Likewise, other lubricants could be introduced in such surface structures.

The invention claimed is:

1. A method for making a slide ring, comprising
producing a slide ring of grey cast iron,
heating a sliding surface of the slide ring by irradiating with radiation,
wherein the irradiating is earned out so that at least a partial region of the irradiated surface is remelted to define a remelted partial region,
wherein parameters of the irradiation are selected so that at least a partial region of the sliding surface has a ledeburitic microstructure after cooling, and further wherein
particles of at least one carbide and/or a self-lubricating substance, are additionally introduced by dispersion into the remelted partial region.

2. The method according to claim 1, wherein the remelting is carried out so that a transition zone with martensitic microstructure occurs between the ledeburitic microstructure and the grey cast iron.

3. The method according to claim 1, wherein the cooling is achieved only by self-quenching.

4. The method according to claim 1, wherein the irradiating comprises one of the following methods: laser beam, electron beam, arc welding, plasma welding, and tungsten inert gas welding.

5. The method according to claim 1, wherein in the production of the slide ring from grey cast iron, at least one carbide forming element is added to the cast iron material, is selected from V, Cr, W, Mo and Si.

6. The method according to claim 1, wherein the irradiating is carried out so that the remelted partial regions and non-remelted partial regions of the sliding surface form a predefined pattern.

* * * * *